Dec. 22, 1964 H. WURZEL 3,162,084
RIGID MULTIPARTITE RETAINING RING WITH
SPRING TONGUE ENGAGING MEANS
Filed April 17, 1961

INVENTOR
HUGO WURZEL
BY
ATTORNEY ent Office 3,162,084
Patented Dec. 22, 1964

3,162,084
RIGID MULTIPARTITE RETAINING RING WITH SPRING TONGUE ENGAGING MEANS
Hugo Wurzel, Bronx, N.Y., assignor to Waldes Kohinoor, Inc., Long Island City, N.Y., a corporation of New York
Filed Apr. 17, 1961, Ser. No. 103,375
1 Claim. (Cl. 85—8.8)

This invention relates to improvements in retaining rings, for use in forming an artificial shoulder on a grooved shaft or like cylindrical workpiece which is capable of axially locating a machine part such as a gear, bearing race and the like thereon, and more particularly to an improved interlocking retaining ring of the general type disclosed and claimed in United States Letters Patents to Waldes No. 2,420,921, dated May 20, 1947, and Heimann et al. No. 2,547,263, dated April 3, 1951 which, with the present application, are commonly owned.

As is well known from said patents, the so-called interlocking retaining ring is comprised of two identical semi-circular ring parts (halves) provided with interlocking means at their oppositely disposed free ends. Such rings have the advantage that they possess the capability of being assembled in a shaft groove without the need for special tools simply by bringing the ring halves together about the shaft, spindle or other workpiece for which they are designed and in the plane of the shaft groove provided therefor, as effects interengagement of the complemental locking means provided at the ends of said ring halves. When so assembled, the ring halves combine with one another to form a complete circular and hence a balanced shoulder of uniform height extending throughout the full circumference of the shaft.

However, despite their obvious advantages, continuing experience with interlocking retaining rings according to the aforesaid patents has shown that they were open to improvement in certain respects. In explanation, the interlocking ring according to Patent No. 2,420,921 is only moderately flexible; that is to say, by the very design thereof, the resiliency of the ring halves making up such a ring is limited to that which permits the end hooks on each ring half to ride over the complemental and oppositely disposed hook parts on the other ring half. Unfortunately, this moderate resiliency is not compatible with a relatively large depth of ring shoulder which is required when the machine part to be retained or located by the ring is provided with large chamfers or corner radii, which follows from the fact that the rigidity of the ring halves increases, more than proportionally, with the height of the shoulder formed thereby, with the result that the ring half having large section height (radial depth) cannot be sufficiently deformed in diameter direction as to allow their oppositely disposed end hooks spreading over each other as is required when the hooks interengage. This prohibition running against large depth of shoulder is also present in the case of the interengagement of the hooks being comparatively deep, as is desirable for secure interlocking of the ring halves.

In passing, it is to be noted that it is also desirable to design the two ring halves so that they deform within the elastic range during assembly, and hence tend to return to the unstressed state after their temporary deformation necessary to assembly. Of course, a small permanent set imparted to the ring halves in their assembly operation would not exclude proper functioning of the ring comprised thereby, so long as the hooks of each ring half rest tightly in the corresponding recesses provided therefor in the companion ring half, so that no play in ring separating direction is possible.

The need for greater resiliency of the ring halves of the interlocking ring as explained has been satisfied to a degree by the ring design of the aforesaid Heimann et al. Patent No. 2,547,263. According to said patent, the ring halves are each provided in the middle-length portion of its inner edge with an arcuate cut-out or set-back having the effect of rendering each said ring half more elastic and hence more readily spreadable. However, by making the ring halves more flexible by providing inner-edge set-backs of considerable arcuate length, as aforesaid, a large portion of the ring circumference fails to make any contact whatsoever with the bottom wall of the groove in which the ring is seated, which of course impairs the secure hold of the ring on groove bottom and lessens its resistance to thrust loads and vibrations.

Stated broadly, an object of the present invention is to obviate the disadvantages of the earlier embodiments of interlocking retaining rings according to said Patents Nos. 2,420,921 and 2,547,263 while preserving and utilizing to the full the recognized merits of the basic ring design of such a ring. In particular, it is a major object of the invention to provide an interlocking retaining ring whose ring halves have resiliency comparing to that of the ring halves according to the aforesaid Heimann et al. Patent No. 2,547,263, while at the same time possessing the capability of making inner-edge contact with the bottom of its seating groove when assembled therein through the substantially full circumference of said groove.

A further object of the invention is the provision of an interlocking retaining ring constructed and arranged so as to be capable of forming a shoulder of sufficient height for retaining machine parts having large chamfer and/or corner radii, on the one hand, and/or at the same time of seating in relatively deep shaft grooves as insures that the ring possesses increased resistance to thrust load and vibration forces tending to dislodge same from the groove, as compared to the prior interlocking retaining rings.

The above stated and other desirable objectives of the present invention are achieved by in effect shifting the resiliency of the ring, or more properly, of each of the ring halves forming the same, from the middle portion thereof as was the case with the ring design of the aforesaid Heimann et al. Patent No. 2,547,263, to an interlocking end portion of each ring half. In practical effect, such transfer makes it possible to construct the bodies of the two ring halves making up the complete ring as rigid parts having increased radial dimension as compared to that of the prior embodiments, which in turn results in increased height of shoulder formed by the ring and/or correspondingly increased depth of seating of the ring in its groove.

For this purpose, the end of each ring half which is to be provided with the increased resilience according to the invention is formed as a cantilever beam which is integrally connected to the rigid body of the ring half at one end thereof. Rather than forming merely a short or stubby hook as heretofore, the beam has considerable arcuate length, i.e. length which approaches that of the arcuate length of the ring body proper, and is provided at its free end with an inwardly directed and relatively non-flexible hook nose or bill adapted to enter a corresponding recess provided therefor in the interlocking end of the complemental or companion ring half. The outer edge of this beam extends along an arc in continuation of the outer edge of the substantially rigid body of the ring half, while the portion along the inner edge of the beam is relieved or set back from the inner circular edge of the rigid ring-half body portion by an amount such that it has considerably lesser radial section height than the middle or body portion of the ring half. Thus, there is formed a relatively elongated, arcuate cut-out inwardly of the beam, which may be considered to extend radially inward from the inner edge of the beam to the circle of the inner edge of the ring-half body.

The aforesaid arcuate cut-out is adapted to be nearly completely filled with a tongue-like projection formed on the interengaging end of the complemental ring half, with the result that, after assembly of the two ring parts to their mutually interlocked relation, they complement each other in forming a substantially complete ring of uniform section height throughout. To further enhance the flexibility of the aforesaid cantilever beam in which one end of each of the ring halves terminates over and above that obtainable by the aforesaid lessening of the radial section height of the beam as compared to that of the rigid body portion, the beam may be formed with progressively decreasing section height, i.e. radial width, beginning with its line of connection with the substantially rigid ring-half body and extending to the inwardly directed nose or bill which forms the terminus of said cantilever beam.

As above forecast, the aforementioned interlocking tongue of the companion or complemental ring half is so shaped that it is adapted to enter and substantially fill the aforesaid space or arcuate cut-out provided inwardly of the cantilever-beam end of the first mentioned ring half, as previously described. It is noted that the inner edge of said interlocking tongue extends in arcuate continuation of the inner edge of the ring body from which it projects, and that the recess into which the radial-inwardly directed nose or bill formed at the end of the inter-engaging cantilever beam of the first ring half is formed at the relatively inner or butt end of said interlocking tongue, and thus in effect extends radially inwardly from the outer circle of its ring half into the portion of the tongue which connects same to the ring body proper.

From the above, it will be appreciated that, when the two ring halves are brought together about a shaft in the plane of the groove therein and their ends interengaged, there is formed a substantially full circular ring of annular configuration made up of the two interengaged halves so tightly interlocked as to be capable of resisting separation under centrifugal forces and thrust loads liable to be encountered in normal retaining ring applications.

In the accompanying drawing illustrating the preferred construction and design of an improved interlocking retaining ring of the invention, FIG. 1 is a plan view of such a ring assembled in the groove of a shaft or like part;

Figure 3:
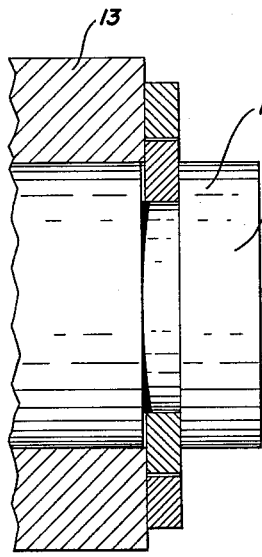
FIG. 3 is a section taken along line 3—3 of FIG. 2 illustrating the shoulder-forming and machine part-retaining function of the ring shown in FIG. 1.
Figure 1:
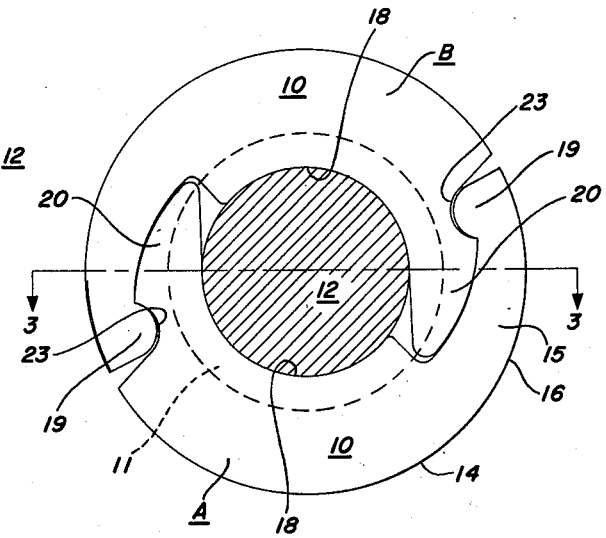
Figure 2:
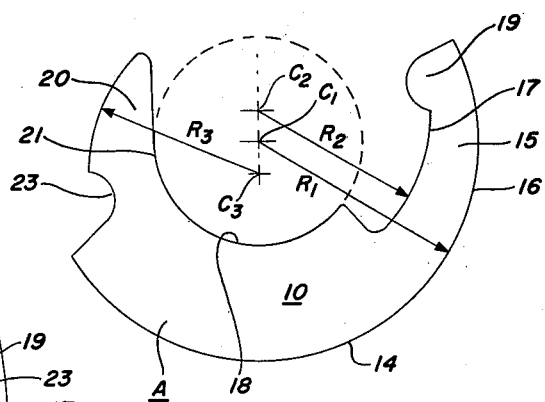
FIG. 2 shows one of the ring halves making up the full ring shown in FIG. 1.

Referring to the drawing in greater detail, FIG. 2 shows in plan one of the two identical but oppositely arranged, complemental ring halves A and B of an interlocking ring according to the present invention, said one ring half designated A comprising a substantially rigid ring body 10 of considerable radial width as not only enables the assembled ring to seat in a relatively deep groove 11 provided therefor in a shaft 12 whereon (FIG. 3) the ring forms an artificial shoulder serving to prevent axial displacement of a machine part 13 relative to said shaft, but also provides a relatively deep shoulder on said shaft. It is a feature of the present invention that one end of said ring half is formed as an elongated arcuate beam 15 (and by "elongated arcuate" is meant arcuate length approaching that of the rigid ring body 10) whose outer edge 16 extends along an arc of radius $R_1$ which is preferably that of the outer edge 14 of the ring half A, with the result that said outer edge 16 of the beam extends in continuation of the ring-body outer edge. In contrast, the inner edge 17 of said beam is relieved or cut back with respect to the inner edge 18 of said ring-half body (which as usual has radius corresponding substantially to that of the bottom of said groove 11) by an amount such that the beam has radial width approximately one half that of the ring body, thus to provide an elongated arcuate cut-out of substantial depth between said beam inner edge and the continued arc of said inner edge 18 for the reception of an interlocking tongue formed on the oppositely directed end of the complemental ring half B (FIG. 1) as will be described.

Preferably, said inner edge 17 of the beam is eccentric to the outer edge 16 thereof in direction such that the radial width of the beam progressively decreases from its root end, which illustratively has radial width somewhat greater than one-half that of the ring body 10, towards its free end. Such is achieved, for example, by forming said inner edge 17 of the beam on an arc of radius $R_2$ struck from a center $C_2$ which is displaced a small distance eccentrically away from the center $C_1$ from which the arcuate outer edges 14, 16 of the ring body and beam, respectively, are struck. The aforesaid free end of the cantilever beam 15 is configured as an inwardly directed, rounded enlargement 19 functioning much as the bill of a hook.

The other end 20 of the ring half A is formed as an elongated tongue-like projection defined inwardly by an inner edge 21 which extends along an arc in substantial continuation of the inner edge 18 of the ring-half body and having arcuate length substantially equal to that of the aforesaid beam 15. The outer edge 22 of said tongue-like projection preferably extends along an arc of radius $R_3$ struck from a center $C_3$ which is eccentric to the center $C_1$ from which the outer edges 14 and 16 of the ring body and beam 15, respectively, are struck but oppositely with respect to the eccentricity of the aforesaid center $C_2$ from said center $C_1$.

Formed in the outer edge of the ring body relatively rearwardly or to the butt end of the projecting tongue 20 is a recess 23 having edge contour complemental to that of the aforesaid bill 19 and hence adapted to receive the bill formed on the opposite end of the complemental ring half B.

As best seen in FIG. 1, the companion ring half B is formed identical but opposite to the just described ring half A and hence will not be described in detail. Suffice it to say that when said ring halves A and B are brought together about the shaft 12 in the plane of the groove 11 thereof and thereupon forced together, the opposite beam and tongue ends of the complemental ring halves A and B interengage and then interlock as in FIG. 1, thereby to form a substantially full-circular, balanced ring shoulder which extends throughout the entire circumference of the shaft 12.

Due to the substantial flexibility of the so-called cantilever beam-end portions 15 of the ring halves, their bill-like terminals 19 are enabled freely to clear and ride over the radially wider end portions of the oppositely directed tongue-like projections 20 of the complemental ring halves which the beam ends engage, and thereupon to snap into the hook or bill-receiving recesses 23 disposed relatively to the rear or butt ends of said tongues, thereby to firmly interengage and interlock with said tongues. Because of the increased resilience provided in the cantilever-beam ends of the ring halves A and B, interlocking of said ring halves may be achieved without the danger of the rings taking on a permanent set during the assembly operation, as could impair the ability of the ring halves to tightly interlock, one with the other, following their temporary deformation in said assembly operation. Moreover, as the ring bodies proper are not required to deform to any appreciable extent, since all deformation takes place in the cantilever-beam ends 15 of the ring halves, said ring bodies may be formed as rigid parts having substantial section height, i.e. radial width, thereby to endow the assembled ring with increased height of shoulder as compared to the prior rings and a capability to seat in grooves of greater depth then heretofore and thus with greater overall resistance to thrust and vibrational forces tending to dislodge same in use.

Figure 4:
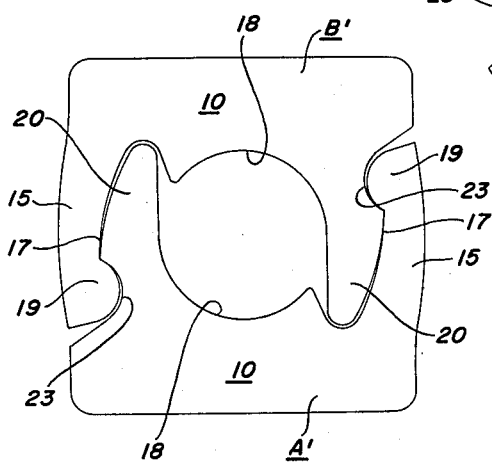
FIG. 4 is a view similar to FIG. 1 but illustrating the interlocking ring as having different (square) external configuration.

Although interlocking retaining rings as generally constructed have circular outer-edge configuration as in FIG. 1, it is also possible for certain uses or specialized installations to form the ring halves with outer-edge configuration such that the final ring is "square" in external outline. Such a square ring is shown in FIG. 4, being made of the ring halves A¹ and B², each having external configuration such as to result in the formation of a square interlocking ring adapted to be assembled by clamping the ring halves together, similar to the FIGS. 1 and 2 ring form.

As changes in carrying out the above constructions without departing from the scope of the invention may be and/or are possible, it is intended that all matter contained in the above description or shown in the accompanying drawing shall be interpreted as illustrative and not in a limiting sense.

I claim:

A retaining ring for forming an artificial shoulder on a cylindrical workpiece provided with a ring seating groove, comprising identical ring parts of spring material adapted when assembled to one another to form a complete annulus having a substantially continuous circular periphery and to be assembled in said groove by being brought together in the plane of said groove and diameter-wise of the workpiece, each ring part having an internal diameter corresponding substantially to the diameter of the groove bottom, the body portion of each ring part having radial width such that it is substantially rigid and the opposite ends of the parts being formed to provide integral, complemental locking means which are adapted to springingly interlock and secure the ring parts together as a complete annulus, the locking means on one end of each ring part comprising an arcuately extending, radially flexible cantilever beam terminating in a radial-inward hook-bill and having arcuate length approaching that of the ring-part body portion and whose outer edge extends in continuation of the arc of the outer edge of said body portion and whose inner edge is set back and from the extended arc of the inner edge of said body portion an amount as results in said beam having radial width which decreases progressively from its root portion which has radial width slightly greater than one-half that of the ring-part body portion toward the hook-bill terminus thereof which has radial width slightly less than one-half that of said body portion, whereby said beam has limited flexibility in radial outward direction and space is provided along its inner edge portion for the reception of the complemental locking means on the opposite end of the other ring part, said complemental locking means on the opposite end of the other ring part comprising a tongue-like projection whose inner edge extends in substantial continuation of the arc of the inner edge of its body portion and which extends into said space, said projection having arcuate length substantially equal to the total arcuate length of said beam and its hook-bill and radial width which progressively decreases from its root portion towards its free end by an amount such that its outer edge extends along and complementally to the inner edge of the associated arcuately extending beam of the other ring part, said projection further having formed in the outer edge of its root portion a radially outwardly disposed recess for the reception of said hook-bill of the associated beam, the inner edge of each beam and the outer edge of each associated projection being arcuate and the inner edge of each said hook-bill and the edge defining each associated recess being also arcuate.

References Cited by the Examiner
UNITED STATES PATENTS

| | | | |
|---|---|---|---|
| 1,492,561 | 5/24 | Gabriel | 85—51 |
| 1,777,614 | 10/30 | Hauger | 85—51 |
| 1,907,506 | 5/33 | Coburn | 85—8.8 |
| 2,420,921 | 5/47 | Waldes | 85—8.8 |
| 2,476,586 | 7/49 | Darash | 85—8.8 |

EDWARD C. ALLEN, Primary Examiner.

CARL W. TOMLIN, Examiner.